(12) United States Patent
Stahl, Jr.

(10) Patent No.: US 6,360,502 B1
(45) Date of Patent: Mar. 26, 2002

(54) FIRESTOP COLLAR MEANS WITH IMPROVED MOUNTING MEANS

(75) Inventor: James P. Stahl, Jr., Stockton, NJ (US)

(73) Assignee: Specified Technologies Inc., Somerville, NJ (US)

( * ) Notice: Subject to any disclaimer, the term of this patent is extended or adjusted under 35 U.S.C. 154(b) by 0 days.

(21) Appl. No.: 09/670,301

(22) Filed: Sep. 26, 2000

(51) Int. Cl.$^7$ .............................. F16L 5/04; F16K 17/38; E04C 2/52
(52) U.S. Cl. .............................. 52/232; 52/220.8; 52/1; 52/712; 52/741.3; 52/745.21
(58) Field of Search ................................ 52/232, 220.8, 52/219, 1, 712, 741.3, 745.21

(56) References Cited

U.S. PATENT DOCUMENTS

| | | | |
|---|---|---|---|
| 3,052,065 A | | 9/1962 | Rettman |
| 3,421,551 A | * | 1/1969 | Currier ........................... 52/65 |
| 3,678,634 A | | 7/1972 | Wise et al. |
| 3,977,137 A | * | 8/1976 | Patry ............................. 52/60 |
| 4,005,560 A | * | 2/1977 | Simpson et al. ............... 52/677 |
| 4,364,210 A | | 12/1982 | Fleming et al. |
| 4,419,535 A | * | 12/1983 | O'Hara ......................... 174/48 |
| 4,538,389 A | | 9/1985 | Heinen |
| 4,573,297 A | | 3/1986 | Benscoter et al. |
| 4,646,486 A | | 3/1987 | Hauff |
| 4,788,800 A | | 12/1988 | Whiteley |
| 4,800,926 A | | 1/1989 | Beck |
| 4,848,043 A | * | 7/1989 | Harbeke .......................... 52/1 |
| 4,850,385 A | * | 7/1989 | Harbeke ....................... 137/75 |
| 4,894,966 A | | 1/1990 | Bailey et al. |
| 4,901,488 A | * | 2/1990 | Murota et al. ................. 52/232 |
| 5,058,341 A | * | 10/1991 | Barbeke, Jr. .................. 52/232 |
| 5,103,609 A | | 4/1992 | Thoreson et al. |
| 5,105,592 A | | 4/1992 | MacMillan et al. |
| 5,121,594 A | | 6/1992 | Wvertz |
| 5,155,957 A | * | 10/1992 | Robertson et al. ............ 52/232 |
| 5,301,475 A | | 4/1994 | Stefely |
| 5,309,688 A | * | 5/1994 | Robertson ................... 52/220.8 |

(List continued on next page.)

FOREIGN PATENT DOCUMENTS

DE 3341728 A1 6/1985

*Primary Examiner*—Carl D. Friedman
*Assistant Examiner*—Phi Dieu Trana
(74) *Attorney, Agent, or Firm*—Sperry, Zoda & Kane

(57) ABSTRACT

The present invention provides a firestop collar with an improved apparatus and method for mounting thereof with respect to a annular cavity formed in a wall or floor around a pipe or other cylindrical member protruding therethrough. The collar member preferably is positioned adjacent to the surface surrounding the protruding member and contains preferably intumescent material therein which is responsive to heat in order to expand and fill the aperture extending through the wall or panel during heat, fire or smoke conditions. The anchoring device for the present invention is adapted to hold the collar in abutment with the structural wall in position surrounding the penetrating conduit and it includes two leg members and an arcuate member. The arcuate member extends between the leg members and is made of a flexibly resilient material and has a radius of curvature less than that of the protruding conduit. The arcuate member can be flexed to cause the arcuate member to assume the same radius of curvature as the annular cavity such that it can extend therethrough such that the arcuate member is movable to the opposite side of the structural member with the two leg members secured at opposite ends of the arcuate member extending outwardly to the first side of the structural member through the cavity. These legs can then be secured to a collar member and with the arcuate member engaging the second surface of the structural member the firestop collar member is held in place securely.

22 Claims, 3 Drawing Sheets

U.S. PATENT DOCUMENTS

| | | |
|---|---|---|
| 5,347,767 A | 9/1994 | Roth |
| 5,393,930 A | 2/1995 | Wvertz |
| 5,410,103 A | 4/1995 | Wvertz |
| 5,417,019 A | 5/1995 | Marshall et al. |
| 5,421,127 A | 6/1995 | Stefely |
| 5,452,551 A | 9/1995 | Charland et al. |
| 5,456,050 A | 10/1995 | Ward |
| 5,634,304 A | 6/1997 | Sakno |
| 5,814,764 A | 9/1998 | Kohaut |
| 5,887,395 A | 3/1999 | Navarro et al. |
| 5,887,396 A * | 3/1999 | Thoreson ............ 52/232 |
| 5,918,424 A * | 7/1999 | Rice ............ 52/65 |
| 5,947,159 A | 9/1999 | Takahashi |
| 5,953,872 A | 9/1999 | MacMillian et al. |
| 5,970,670 A | 10/1999 | Hoffman |

\* cited by examiner

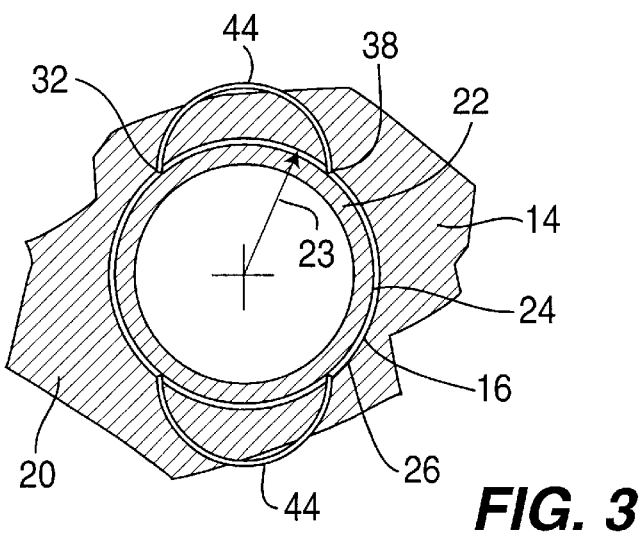
FIG. 3
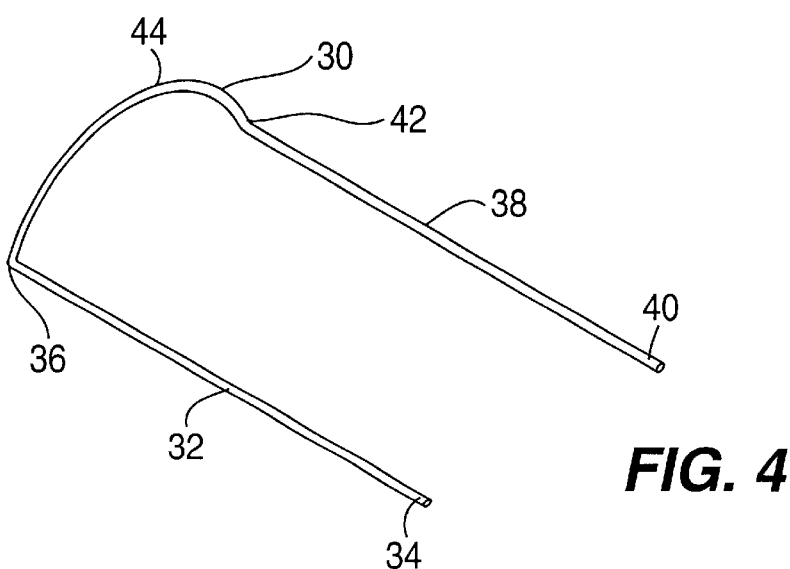
FIG. 4
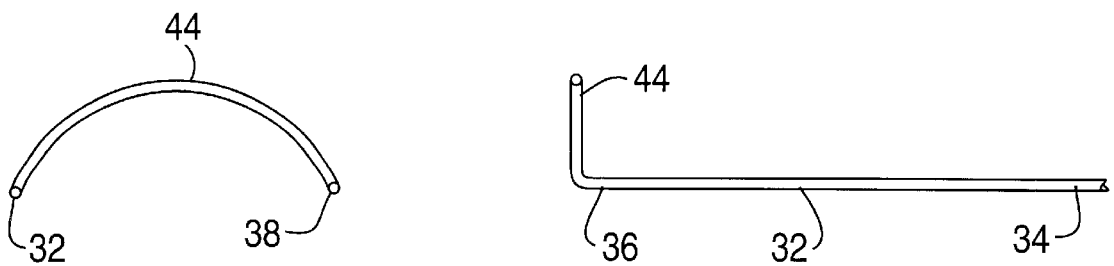
FIG. 6   FIG. 5

POSITIONED FOR INSTALLATION
VIEWED FROM ABOVE

ALLOWED TO SPRING BACK OUT
OVER THE LIP OF THE OPENING

FIRESTOP COLLAR MEANS WITH IMPROVED MOUNTING MEANS

BACKGROUND OF THE INVENTION

1. Field of the Invention

The present invention deals with the field of devices for fire prevention. More particularly the present invention deals with the field of firestop collars adapted to be positioned adjacent to apertures or openings in structural walls in order to seal them in response to a fire condition Such collars often include an intumescent material therein which is responsive to heat to expand rapidly to fill such apertures or holes in structural members in order to prevent fire from spreading from room to room or floor to floor.

More particularly the present invention deals with means for attachment of such firestop collars in position adjacent to apertures in walls and floors and ceilings normally adjacent pipes or other conduits which are necessary in such structures to extend through structural members. These pipes or conduits are usually made of plastic material and can be seriously degraded by fire or heat. It is important that such fixtures or collars be held firmly adjacent to any openings through the structural members in order to more effectively close them preferably with intumescent material when a fire occurs.

2. Description of the Prior Art

There have been a number of patents granted on various configurations for firestop collars and attachment devices such a U.S. Pat. No. 3,052,065 patented Sep. 4, 1962 to R. J. Rettman and assigned to James H. Matthews & Company on "Memorial Vase Retaining Brackets"; and U.S. Pat. No. 3,678,634 patented Jul. 25, 1972 to E. H. Wise et al and assigned to R & G Sloane Manufacturing Company, Inc. on a "Fire Isolation And Insulating Apparatus"; and U.S. Pat. No. 4,364,210 patented Dec. 21, 1982 to P. B. Fleming et al and assigned o Minnesota Mining and Manufacturing Company on a "Fire Barrier Device"; and U.S. Pat. No. 4,538, 389 patented Sep. 3, 1985 to H. Heinen and assigned to Intellectual Trade CY S.A. on a "Fire-Break"; and U.S. Pat. No. 4,573,297 patented Mar. 4, 1986 to R. D. Benscoter et al and assigned to Butler Manufacturing Company on an "Economy Poke-Thru"; and U.S. Pat. No. 4,646,486 patented Mar. 3, 1987 to W. Hauff on a "Flame-Retarding Wall Feedthrough Fitting"; and U.S. Pat. No. 4,788,800 patented Dec. 6, 1988 to J. D. Whiteley and assigned to Monsanto Canada Inc., on a "Fire Stop Device"; and U.S. Pat. No. 4,800,926 patented Jan. 31, 1989 to P. C. Beck and assigned to Adolph Coors Company on a "Firebreak For Conduits"; and U.S. Pat. No. 4,894,966 patented Jan. 23, 1990 to P. R. Bailey et al on a "Fire Stopping Apparatus"; and U.S. Pat. No. 4,901,488 patented Feb. 20, 1990 to G. Murota et al and assigned to The Furukawa Electric Co., Ltd. on a "Fire/Smoke Protection Structure For Plastic Pipe Or Cable Channel Portion In A Floor Or Wall"; and U.S. Pat. No. 5,103,609 patented Apr. 14, 1992 to T. L. Thoreson et al and assigned to Minnesota Mining & Manufacturing Company on an "Intumescent fire Stop Device"; and U.S. Pat. No. 5,105,592 patented Apr. 21, 1992 to G. S. MacMillan et al and assigned to Fire Barrier Installations, Inc. on a "Fire Barrier Device"; and U.S. Pat. No. 5,121,594 patented Jun. 16, 1992 to E. S. Wuertz and assigned to Hubbell Incorporated on a "Method For Attaching A Poke-Through Electrical Fitting"; and U.S. Pat. No. 5,301,475 patented Apr. 12, 1994 to S. F. Stefely on a "Fire Stop Device"; and U.S. Pat. No. 5,347,767 patented Sep. 20, 1994 to R. Roth on a "Fire Retardant Sleeve"; and U.S. Pat. No. 5,393,930 patented Feb. 28, 1995 to E. S. Wuertz and assigned to Hubbell Incorporated on a "Self-Anchoring Poke-Through Wiring Device"; and U.S. Pat. No. 5,410,103 patented Apr. 25, 1995 to E. S. Wuertz and assigned to Hubbell Incorporated on a "Self-Anchoring Poke-Through Wiring device"; and U.S. Pat. No. 5,417,019 patented May 23, 1995 to D. P. Marshall et al and assigned to Lamson & Sessions Co. on a "Passthrough Device With Firestop"; and U.S. Pat. No. 5,421,127 patented Jun. 6, 1995 to S. F. Stefely on a "Fire Stop Closure"; and U.S. Pat. No. 5,452,551 patented Sep. 26, 1995 to P. J. Charland et al and assigned to Minnesota Mining and Manufacturing Company on a "Tiered Firestop Assembly"; and U.S. Pat. No. 5,456, 050 patented Oct. 10, 1995 to T. T. Ward and assigned to Construction Consultants & Contractors, Inc. on a "System To Prevent Spread Of Fire And Smoke Through Wall-Breaching Utility Holes"; and U.S. Pat. No. 5,634,304 patented Jun. 3, 1997 to M. P. Sakno on a "Water Impervious Intumescent Firestop Collapsing Conduit"; and U.S. Pat. No. 5,814,764 patented Sep. 29, 1998 to J. E. Kohaut and assigned to Raceway Components, Inc. on an "Insert For Poke-Through Fitting"; and U.S. Pat. No. 5,887,395 patented Mar. 30, 1999 to M. Navarro et al and assigned to International Protective Coatings Corp. and Pyro-Tech Industries Inc. on a "Firestop Sleeve"; and U.S. Pat. No. 5,887,396 patented Mar. 30, 1999 to T. L. Thoreson and assigned to Minnesota Mining and Manufacturing Company on an "Intumescent Fire Stop Device Having Quick Fasteners"; and U.S. Pat. No. 5,947,159 patented Sep. 7, 1999 to J. Takahashi and assigned to Tosetz Co., Ltd. on a "Fire Retarding Division Penetrating Member"; and U.S. Pat. No. 5,953,872 patented Sep. 21, 1999 to G. S. MacMillian et al on a "Fire Barrier Assembly"; and U.S. Pat. No. 5,970,670 patented Oct. 26, 1999 to W. H. Hoffman and assigned to J. W. Bollom & Co., Ltd. on an "Intumescent Fire Arrester Collar For Pipelines"; and German Patent No. DE 3341 728 A1 patented Jun. 5, 1985 to J. Ostermann.

SUMMARY OF THE INVENTION

The present invention provides a firestop collar with an improved mounting device positionable adjacent to a cavity defined in a structural panel with an aperture therein. This aperture normally extends from the first to the second side of the structural panel and is formed in order to receive a generally cylindrical penetrating member such as a pipe or conduit extending therethrough for providing electrical HVAC, water or other conduit communication between rooms or floors in a building. These pipes are usually made of a plastic material. Normally these apertures are round and receive pipes which are generally cylindrical and penetrate completely through from the first to the second side of the structural panel. The structural panel can comprise a wall, ceiling or floor of conventional construction.

The firestop collar is designed to be positioned adjacent to a plastic pipe member or other penetrating member extending through such structural panels in order to seal these openings during fire conditions to minimize spreading of a fire throughout a structure. It is normally these openings through the structural panels which provides the pathways through which fire can quickly spread and the present invention provides a collar with intumescent material therein adapted to expand for sealing such openings responsive to sensing of heat.

The firestop collar assembly includes a collar member positionable adjacent the first side of the structural panel surrounding the cylindrical penetrating member adjacent the cavity defined between the cylindrical penetrating member and the structural panel. In this manner it facilitates sealing of the aperture in order to inhibit the movement of fire, smoke and heat through the aperture. The collar is held in place in surrounding engagement to the penetrating member by an anchoring device. At least one or more such anchoring devices are used to hold each collar with respect to the structural panel adjacent the aperture extending therethrough. Each anchor includes a first leg member attached to the collar member and extendable through the cavity of the structural panel to the second side thereof. The first leg member defines a first collar end attachable to the collar member adjacent the first side of the structural panel and a first protruding end spatially disposed from the first collar end and positionable extending through the cavity to the second side of the structural panel. A second leg member is also included which is attached to the collar member at a position spatially disposed from the first leg member and similarly configured. An arcuate member is secured to the first protruding end of the first leg member and to the second protruding end of the second leg member and is configured extending through an arcuate shaped curve therebetween. This arcuate member is formed of a flexibly resilient material to allow selective modification of the radius of curvature thereof to facilitate insertion of the anchoring means through the cavity for engagement of the structural panel to facilitate retaining of the collar member adjacent the cavity on the first side of the structural member.

The use of this unique firestop collar assembly is performed by applying of a force to the leg members in order to increase the relative distance therebetween for increasing the radius of curvature of the arcuate member by flexing thereof such that the increased radius of curvature is approximately equal to the radius of curvature of the annular cavity. An anchoring device is always chosen for such an application which has a radius of curvature somewhat less than the radius of curvature of the penetrating member in order to allow it to flex to the steady state position for holding of the anchoring member with respect to the opposite surface of the structural member. The arcuate member is then inserted through the annular cavity completely to a position adjacent the second surface of the structural member with the two leg members extending outwardly therefrom through the annular cavity and extending therefrom adjacent the first surface of the structural member.

Thereafter the force on the leg members is released in order to allow the legs and the arcuate member to assume the steady state radius of curvature thereof in order to allow the arcuate member to now extend outwardly from the annular cavity. This arcuate member will then move into abutment with the second surface of the structural member immediately adjacent the annular cavity for securement thereagainst with both leg members positioned extending therefrom through the cavity and exiting thereof adjacent the first surface of the structural member.

The firestop collar is then selectively secured to the legs of the anchoring device in a position in surrounding engagement with respect to the generally cylindrical member in abutment with the first side of the structural member around the aperture defined therethrough in order to facilitate sealing thereof responsive to fire conditions. In the preferred configuration, the legs of the anchoring means will be positioned directly in abutment with respect to the outer surface of the generally cylindrical penetrating member such that they are held thereagainst by the firestop collar member positioned extending around both the penetrating member and the legs. Thus the legs will be held in place by the pressure directed inwardly by the collar member against the penetrating member. The legs are then bent outwardly under the firestop collar to firmly secure it in place adjacent to the first surface of the panel. Finally the legs are trimmed as to length such that they do not stick out laterally beyond the thickness of the firestop collar itself.

The present invention provides a firestop collar with improved mounting means positioned adjacent to a cavity defined between a structural panel having an aperture therein extending from the first side to the second side thereof and a generally cylindrical penetrating member extending through the aperture, wherein maintenance costs are minimized.

The present invention provides a firestop collar with improved mounting means positioned adjacent to a cavity defined between a structural panel having an aperture therein extending from the first side to the second side thereof and a generally cylindrical penetrating member extending through the aperture, wherein installation is simplified.

The present invention provides a firestop collar with improved mounting means positioned adjacent to a cavity defined between a structural panel having an aperture therein extending from the first side to the second side thereof and a generally cylindrical penetrating member extending through the aperture, wherein capital costs for equipment is minimized.

The present invention provides a firestop collar with improved mounting means positioned adjacent to a cavity defined between a structural panel having an aperture therein extending from the first side to the second side thereof and a generally cylindrical penetrating member extending through the aperture, wherein the firestop collar is firmly secured adjacent the aperture even if the generally cylindrical penetrating member in any way disintegrates or deteriorates responsive to the fire conditions.

The present invention provides a firestop collar with improved mounting means positioned adjacent to a cavity defined between a structural panel having an aperture therein extending from the first side to the second side thereof and a generally cylindrical penetrating member extending through the aperture, wherein damage thereof responsive to excess heat is minimized.

The present invention provides a firestop collar with improved mounting means positioned adjacent to a cavity defined between a structural panel having an aperture therein extending from the first side to the second side thereof and a generally cylindrical penetrating member extending through the aperture, wherein adjustability of positioning of the firestop collar with respect to the aperture is possible.

The present invention provides a firestop collar with improved mounting means positioned adjacent to a cavity defined between a structural panel having an aperture therein extending from the first side to the second side thereof and a generally cylindrical penetrating member extending through the aperture, wherein the firestop collar used can include an intumescent material therein for expansion.

The present invention provides a firestop collar with improved mounting means positioned adjacent to a cavity defined between a structural panel having an aperture therein extending from the first side to the second side thereof and a generally cylindrical penetrating member extending through the aperture, wherein the cavity is preferably annular to facilitate the use of an arcuate member for engaging the second side of the structural member.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 3 is a top cross-sectional view of an embodiment of the firestop collar means and improved mounting mean of the present invention shown using two individual anchoring devices;

FIG. 4 is a perspective illustration of an embodiment of the anchoring means of the present invention;

FIG. 5 is a side plan view of an embodiment of the anchoring means of the present invention;

FIG. 6 is a top plan view of an embodiment of the anchoring means of the present invention;

DETAILED DESCRIPTION OF THE PREFERRED EMBODIMENT

Figure 1:
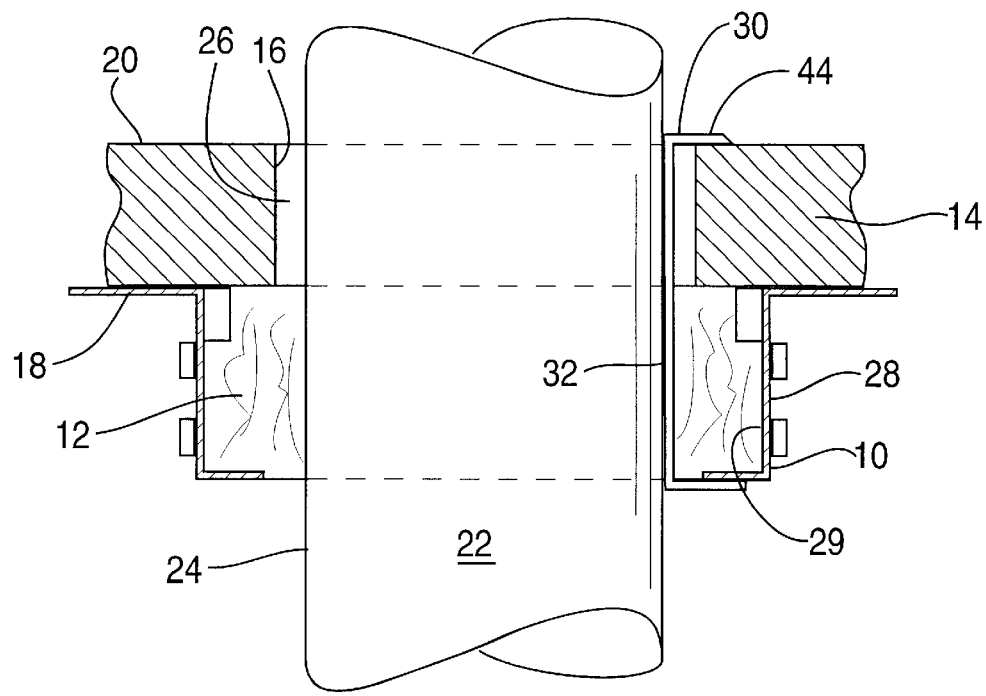
FIG. 1 is a cross-sectional view of an embodiment of firestop collar means with improved mounting means of the present invention shown installed utilizing a single anchoring means.

The present invention provides a firestop collar 10 with an improved anchoring or mounting means 30 which is positionable adjacent to a cavity 26. This cavity 26 is preferably of an annular shape and is defined in a structural panel 14. Such structural panels can comprise walls, floor or ceilings of conventional structure.

It s necessary that such structural panels 14 have apertures 16 defined therein for various purposes. These apertures are necessary in order to provide communication between adjacent walls or floors such as for HVAC equipment, electrical wiring, pipes for plumbing, intercom systems, or other necessary devices. Most particularly, however, these firestop collars 10 are used adjacent to plumbing fixtures since they require enlarged openings through the panels, such as wall, ceiling or floor, extending from room to room immediately about the outer surface of such a pipe or generally cylindrical penetrating member 22. These openings need to be formed larger than the penetrating pipe or member in order to allow for installation thereof. The annular openings remaining around such pipes are sometimes sealed with conventional sealant and are sometimes left open. The firestop fixture is designed to fill this opening under fire or heat conditions regardless of whether or not it has been presealed. These penetrating members extending through the apertures 16 will normally go all the way between the first surface 18 of the structural panel 14 and the second surface 20 thereof. As such, the penetrating member 22 will define a cavity 26 between the external surface 24 of the penetrating pipe member 22 and the interior edge of the aperture 16 in the structural panel 14. This annular region needs to be sealed whenever a fire occurs and for this reason a firestop collar 10 needs to be held immediately threadjacent and will preferably define a chamber mean 29 therein filled with intumescent material 12 adapted to rapidly expand responsive to heat conditions.

This cavity 26 which is usually annular in shape has a specific radius of curvature normally approximately equal to the radius of curvature 23 of the penetrating member 22.

The individual collar member 28 is preferably attached in surrounding engagement to the penetrating pipe member 22, which is normally made of plastic material, in such a manner as to be immediately adjacent to the annular cavity 26 to facilitate sealing thereof during fire conditions.

The present invention deals specifically with the means of attaching of the collar member 28 into position immediately adjacent to the cavity 26 around the penetrating member 22 without requiring any means of attachment directly to the area surrounding the structural panel 14 adjacent the aperture 16 such as by screws or bolts.

This quick and easy means of firm attachment is achievable by the anchoring means 30 of the present invention. The anchoring means 30 is shown best in FIGS. 4, 5 and 6. It is shown installed for locking of a collar with respect to a structural panel 14 in FIGS. 1, 2 and 3. The anchoring device includes a first leg member 32 which is designed to extend through the annular cavity 26 with the first collar end 34 extending out of the cavity adjacent the second surface 20 of the structural panel 14. In a similar manner the first protruding end 36 is adapted to extend outwardly from the annular cavity 26 to a position adjacent the second surface 20 of the structural panel 14. An arcuate member 44 is secured to the first protruding end 36 of first leg member 32.

A second leg member 38 is secured to the arcuate member 44 at a position spatially disposed from the first leg member 32. This second leg member 38 includes a second collar end 40 and a second protruding end 42.

The arcuate member 44 is generally semi-circular in shape and is of a flexibly resilient material. This arcuate member 44 is chosen such that the radius of curvature thereof is slightly less than the radius of curvature of the penetrating member 22. This is the steady state position of the arcuate material 44 which is made of a flexibly resilient material. However, the arcuate member 44 needs to be capable of being flexed outwardly to an outwardly flexed state or position 48 such that it is approximately equal to the radius of curvature 23 of the penetrating member 22. This radius of curvature 50 of the arcuate member 44 needs to have a steady state position 46 which is less than the radius of curvature 23 of the penetrating member 22. However, the arcuate member 44 needs to be capable of being flexed outwardly to the outwardly flexed position 48 sufficient that it extend wide enough such that it can be placed through the generally annular cavity 26 defined between the edge of the aperture 16 and the external surface 24 of the penetrating member 22.

Another way of viewing the variation in the shape of the arcuate member 44 is by analyzing the angle of the sector or pie-shaped wedge through which it extends in the two positions. Normally the arcuate member extends through an angle of approximately 127 degrees preferably when it is in the flexed position and extends through an arc of approximately 134 degrees when in the steady state position. These are the sector angles 52 of the arcuate member.

Figure 2:
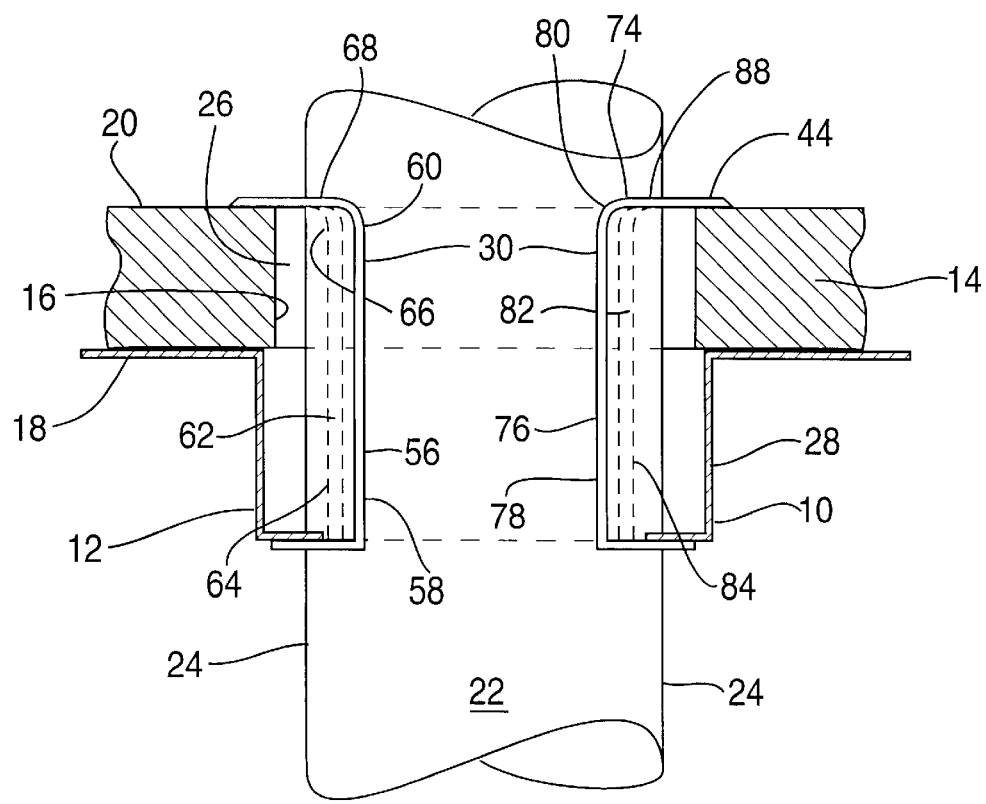
FIG. 2 is a cross-sectional view of an embodiment of a firestop collar means with improved mounting means of the present invention shown installed using two individual anchoring means.
Figure 7:
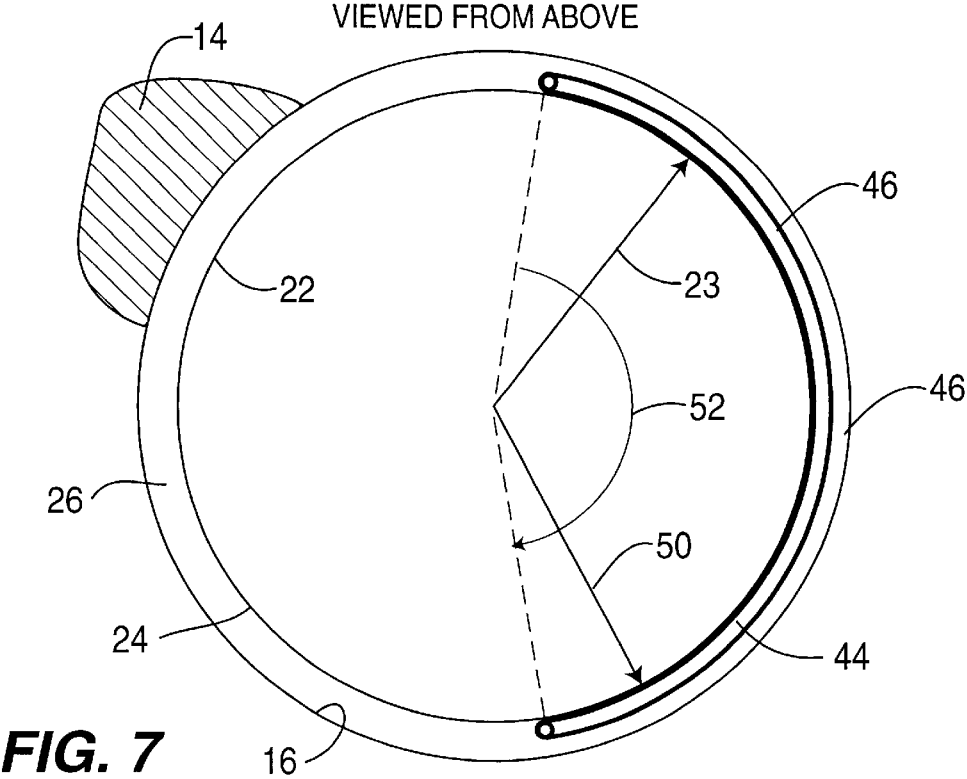
FIG. 7 is a top schematic illustration showing the relative position between the anchoring means and the annular cavity during installation.
Figure 8:
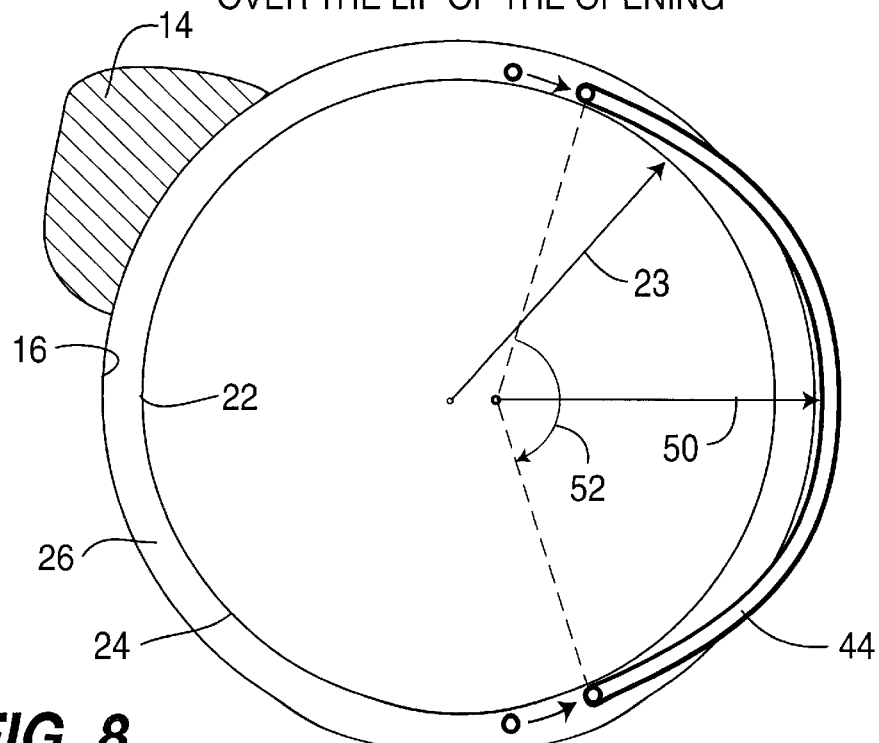
FIG. 8 is a top schematic illustration showing the relative position between the anchoring means and the annular cavity after installation with the arcuate member extending outwardly in abutment with respect to the second surface of the structural member.

In an alternative configuration of the present invention as shown in FIG. 2 two separate anchor members will be included defined in this figure as a primary anchor member 54 and second anchor member 74. Primary anchor member 54 includes a first primary leg member 56 and a first primary collar end 58. It also includes a first primary protruding end 60. Each primary anchor member also includes a second primary leg member 62 connected to the primary arcuate member 68 at the first primary protruding end 60 thereof. This second primary leg member will include a second primary collar end 64 and a second primary protruding end 66. First primary leg member 56 and second primary leg member 62 are secured to the primary arcuate member 68 spaced apart from one another to facilitate anchoring therewith.

A second anchor member 74 is also included in this construction including a first secondary leg member 76. This first secondary leg member 76 includes a first secondary collar end 78 and a first second protruding end 80. A second secondary leg member 82 is included with a second secondary collar end 84 and a second secondary protruding member 86. The first secondary leg member 76 and the second secondary leg member 82 are connected to the secondary arcuate member 88 spatially apart from one another to facilitate the urging of force thereon for varying the shape of the secondary arcuate member 88 extending therebetween.

The method of use of the anchoring means of the present invention is simple and expedient and does not necessarily require any penetrating screw-type members for securement of the firestop collar 10 with respect to the structural panel 14. This anchoring means 30 is usable by first choosing an individual anchoring means 30 having a radius of curvature less than the radius of curvature of the external surface 24 of the penetrating member 22. The installer can then grasp the first leg member 32 and the second leg member 38 and urge them apart until the arcuate member 44 assumes the outwardly flexed position 48 such that the radius of curvature is approximately equal to the radius of curvature of the annular cavity 26. The installer will then insert the arcuate member 44 through the annular cavity 26 until it extends completely therethrough.

The installer can then release the force being exerted on the first and second leg members 32 and 38 to allow the arcuate member 44 to return to the steady state position 46 wherein the radius of curvature 50 thereof is less than the radius of curvature of the annular cavity 26. The legs 32 and 38 can then be bent outwardly below the collar to more firmly secure it in place and they can be trimmed in length such that they do not extend out laterally beyond the outermost surface of the collar itself. In this manner the arcuate member 44 will be captured in position extending through the annular cavity 26 with the first collar end 34 of the first leg member 32 and the second collar end 40 of the second leg member 38 extending outwardly from the annular cavity 26 at a position adjacent the first surface 18 of the structural panel 14. In this position the arcuate member 44 will be in abutment with the second surface 20. As such the collar member 28 can then be secured to the first collar end 34 of first leg 32 and the second collar end 40 of second leg 38 in position in surrounding engagement with the penetrating member 22 immediately in abutment with the aperture 16 on the first surface 18 of the structural panel 14. In this position the intumescent material 12 contained therein is ready to rapidly expand to fill the aperture 16 responsive to excessive conditions of fire or heat. Removal, if found necessary, an be equally easily achieved by merely spreading the first leg member 32 and second leg member 38 apart until the radius of curvature 50 of the arcuate member matches that of the annular cavity 26 and the arcuate member 44 can be easily removed by movement thereof through the generally annular cavity 26. With this method a simple means of attachment of a firestop collar 10 in surrounding engagement with a penetrating member 22 can be achieved without utilizing any means for penetrating the structural panel 14 and compromising the strength thereof.

It should be appreciated that the present invention is particularly designed for use with standard wallboard stud wall construction. However, the design will also work on concrete floors, walls and ceilings. It is also an important aspect of the present invention that securement of the collar member 28 to the first surface 18 of the structural panel 14 is achieved without the use of any radially extending member. Such devices conventionally rely upon the external surface 24 of the penetrating member 22 for strength. The present invention, however, provides a device which will be firmly secured with respect to an aperture 16 and a structural panel 14 with a penetrating member 22 extending therethrough even under conditions where the generally cylindrical penetrating member 22 is disintegrate or destroyed due to the fire conditions which give rise to expansion of the intumescent material within the firestop collar. Many other devices have been utilized which bear against the external surface 24 of the penetrating member 22. However, these devices can be compromised in those situations where the penetrating member is destroyed or in any way deteriorated such that it no longer provides a firm outer surface against which to bear. The present invention provides a means for securement of the firestop collar 10 to the structural panel 14 without requiring any members being brought into abutment with the externals surface 24 of the generally cylindrical penetrating member 22 in the fully installed position. As shown in the preferred embodiment of FIG. 1, it is preferable that the first and second legs members 32 and 38 be positioned immediately in abutment with the external surface 24 of the penetrating member 32. In this manner the collar 28 will exert an inwardly directed bias which will tend to bind the leg members in place between the external surface of the penetrating member 32 and the inside of the collar 28. This greatly facilitates installation and makes the anchoring means 30 usable with a greater variety of different sizes of penetrating members and aperture sizes.

The first and second legs members 32 and 38 and the arcuate member 44 are preferably formed as a single integral member from a metal such as stainless steel or other similar material. It is advantageous for the arcuate member 44 and the first and second protruding ends 36 and 42 to be more flexibly resilient. Thus these areas, when made from metal, are preferably heat treated to increase the resilient flexibility thereof. However, it is advantageous for the body of the legs 32 and 38 and the first and second protruding ends 36 and 42 to be of a less resilient and more pliable material in order to allow bending thereof to facilitate securement with respect to the collar member 28 thereadjacent, thus these areas are normally not heat treated.

The apparatus of the present invention is a distinct improvement over the prior art designs since it is more universally applicable. Most prior art designs include radially extending members extending all around the aperture outwardly on the second side of the panel member to secure the collar in place. With the present invention the use of on or two of the uniquely shaped installation clips allows an installation into an aperture defined immediately adjacent an obstructing object such was a wall stud or other immovable member since only one or two clips is required for achieving securement. With prior art devices requiring radially extending members peripherally around the aperture, they would not be usable in certain situations where immovable obstructing objects are present immediately adjacent the aperture.

Prior art constructions often provide limitations on the sizing of the firestop collar. Many devices using radially extending members require that the firestop collar be equal to or slightly smaller than the aperture. In the present invention this limitation is not a requirement. Thus, if required, the fire stop collar can be sized larger than the aperture with the mounting clips extending vertically through the annular immediately adjacent the penetrating pipe member with the firestop member wedging the clips in position against the pipe. Thus, the footprint of the firestop collar on the panel can be larger than the aperture which was not possible with most prior art devices. In situations where it is likely that a portion of the panel may blow out or otherwise degrade, the sizing of the firestop collar larger than the aperture size can be a very desirable feature.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A firestop collar means with improved mounting means positioned adjacent a cavity defined between a structural panel having an aperture therein extending from the first side to the second side thereof and a generally cylindrical penetrating member extending through the aperture, said firestop collar means comprising:
   A. a collar member positioned adjacent the first side of the structural panel surrounding the cylindrical penetrating member adjacent the cavity defined between the cylindrical penetrating member and the structural panel to facilitate sealing of the aperture to inhibit movement of fire, heat and smoke therethrough;
   B. an anchoring means comprising:
      (1) a first leg member attached to said collar member and extending through the cavity of the structural panel to the second side thereof, said first leg member defining a first collar end attached to the collar member adjacent the first side of the structural panel and a first protruding end spatially disposed from said first collar end and extending through the cavity to the second side of the structural panel;
      (2) second leg member attached to said collar member at a position spatially disposed from said first leg member, said second leg member extending through the cavity of the structural panel to the second side thereof, said second leg member defining a second collar end attached to the collar member adjacent the first side of the structural panel and a second protruding end spatially disposed from said second collar end and extending through the cavity to the second side of the structural panel; and
      (3) an arcuate member secured to said first protruding end of said first leg member and to said second protruding end of said second leg member and extending through an arcuate shaped curve therebetween, said arcuate member being formed of a flexibly resilient material to allow selective modification of the radius of curvature thereof to facilitate insertion of said anchoring means through the cavity for engagement of the arcuate member with the second side of the structural panel to facilitate retaining of said collar member adjacent the cavity on the first side of the structural member.

2. A firestop collar means with improved mounting means positioned adjacent a cavity defined between a structural panel having an aperture therein extending from the first side to the second side thereof and a generally cylindrical penetrating member extending through the aperture as defined in claim 1 wherein the steady state radius of curvature of said arcuate member of said anchoring means is less than the radius of curvature of the generally cylindrical penetrating member to facilitate maintaining of abutment of said arcuate member with respect to the outer surface thereof during installation and to facilitate engagement of said arcuate member with respect to the second surface of the structural member when positioned installed through the cavity to the second side of the structural member.

3. A firestop collar means with improved mounting means positioned adjacent a cavity defined between a structural panel having an aperture therein extending from the first side to the second side thereof and a generally cylindrical penetrating member extending through the aperture as defined in claim 1 wherein said arcuate member is made of a flexibly resilient material which is sufficiently flexible in order to assume a radius of curvature approximately equal to the radius of curvature of the generally cylindrical penetrating member to facilitate insertion of said anchoring means through the cavity defined in the aperture between the structural member and the generally cylindrical penetrating member.

4. A firestop collar means with improved mounting means positioned adjacent a cavity defined between a structural panel having an aperture therein extending from the first side to the second side thereof and a generally cylindrical penetrating member extending through the aperture as defined in claim 1 wherein the cavity defined in the aperture between the structural member and the penetrating member is generally annular in shape to facilitate extending of said first leg member and said second leg member and said arcuate member therethrough and to facilitate engagement of said arcuate member with respect to the second side of the structural member and retaining of said collar member with respect to the first side of the structural member adjacent said aperture therein.

5. A firestop collar means with improved mounting means positioned adjacent a cavity defined between a structural panel having an aperture therein extending from the first side to the second side thereof and a generally cylindrical penetrating member extending through the aperture as defined in claim 1 wherein said arcuate member extends through an angle of approximately 134 degrees with a radius of curvature less than the radius of curvature of the penetrating member when in the steady state position in order to facilitate securement of said anchoring means with respect to the second side of the structural member.

6. A firestop collar means with improved mounting means positioned adjacent a cavity defined between a structural panel having an aperture therein extending from the first side to the second side thereof and a generally cylindrical penetrating member extending through the aperture as defined in claim 1 wherein said arcuate member of said anchoring means is of a semi-circular shape.

7. A firestop collar means with improved mounting means positioned adjacent a cavity defined between a structural panel having an aperture therein extending from the first side to the second side thereof and a generally cylindrical penetrating member extending through the aperture as defined in claim 1 wherein said arcuate member extends through an angle of approximately 127 degrees with a radius of curvature approximately equal to the radius of curvature of the penetrating member when in the flexed position in abutting contact with respect to the exterior surface of the generally cylindrical member for movement thereof through said cavity during insertion of said anchoring means.

8. A firestop collar means with improved mounting means positioned adjacent a cavity defined between a structural panel having an aperture therein extending from the first side to the second side thereof and a generally cylindrical penetrating member extending through the aperture as defined in claim 1 wherein said first leg member, said second leg member and said arcuate member of said anchoring means are formed of a single integral section of flexible metal wire to facilitate insertion thereof into the cavity for engaging of said arcuate member against the second surface of the structural member.

9. A firestop collar means with improved mounting means positioned adjacent a cavity defined between a structural panel having an aperture therein extending from the first side to the second side thereof and a generally cylindrical penetrating member extending through the aperture as defined in claim 1 wherein said collar member defines a chamber means therewithin and wherein said chamber means contains an intumescent material which is expandable responsive to exposure to heat to fill the aperture defined in the structural member.

10. A firestop collar means with improved mounting means positioned adjacent a cavity defined between a structural panel having an aperture therein extending from the first side to the second side thereof and a generally cylindrical penetrating member extending through the aperture as defined in claim 1 wherein said anchoring means is positioned spatially disposed from the penetrating member whenever said arcuate member is in the position of engagement with respect to the second side of the structural member to facilitate maintaining of engagement between said arcuate member and the second side of the structural member and engagement of said collar member with the structural member adjacent the aperture defined therein responsive to a possible condition of disintegration of the generally cylindrical penetrating member during exposure thereof to excessive heat.

11. A firestop collar means with improved mounting means positioned adjacent a cavity defined between a structural panel having an aperture therein extending from the first side to the second side thereof and a generally cylindrical penetrating member extending through the aperture as defined in claim 1 wherein said first leg member and said second leg member of said anchoring means extend approximately parallel with respect to one another and wherein said first leg member and said second leg member extend outwardly away from said arcuate member in a direction approximately perpendicular with respect thereto.

12. A firestop collar means with improved mounting means positioned adjacent a cavity defined between a structural panel having an aperture therein extending from the first side to the second side thereof and a generally cylindrical penetrating member extending through the aperture as defined in claim 1 wherein said anchoring means is made of metal material and wherein said arcuate member and said first protruding end of said first leg member and said second protruding end of said second leg member are heat treated to enhance flexible resilience thereof.

13. A firestop collar means with improved mounting means positioned adjacent a cavity defined between a structural panel having an aperture therein extending from the first side to the second side thereof and a generally cylindrical penetrating member extending through the aperture, said firestop collar means comprising:

A. a collar member positioned adjacent the first side of the structural panel surrounding the cylindrical penetrating member adjacent the cavity defined between the cylindrical penetrating member and the structural panel to facilitate sealing of the aperture to inhibit movement of fire, heat and smoke therethrough;

B. an anchoring means comprising:
  (1) a primary anchor member comprising:
    (a) a first primary leg member attached to said collar member and extending through the cavity of the structural panel to the second side thereof, said first primary leg member defining a first primary collar end attached to the collar member adjacent the first side of the structural panel and a first primary protruding end spatially disposed from said first primary collar end and extending through the cavity to the second side of the structural panel;
    (b) a second primary leg member attached to said collar member at a position spatially disposed from said first primary leg member, said second primary leg member extending through the cavity of the structural panel to the second side thereof, said second primary leg member defining a second primary collar end attached to the collar member adjacent the first side of the structural panel and a second primary protruding end spatially disposed from said second primary collar end and extending through the cavity to the second side of the structural panel;
    (c) a primary arcuate member secured to said first primary protruding end of said first primary leg member and to said second primary protruding end of said second primary leg member and extending through an arcuate shaped curve therebetween, said primary arcuate member being formed of a flexibly resilient material to facilitate insertion of said primary anchoring member through the cavity for engagement of the primary arcuate member with the second side of the structural panel to facilitate retaining of said collar member adjacent the cavity on the first side of the structural member; and
  (2) a secondary anchor member comprising:
    (a) a first secondary leg member attached to said collar member and extendable through the cavity of the structural panel to the second side thereof, said first secondary leg member defining a first secondary collar end attached to the collar member adjacent the first side of the structural panel and a first secondary protruding end spatially disposed from said first secondary collar end and extending through the cavity to the second side of the structural panel;
    (b) a second secondary leg member attached to said collar member at a position spatially disposed from said first secondary leg member, said second secondary leg member extending through the cavity of the structural panel to the second side thereof, said second secondary leg member defining a second secondary collar end attached to the collar member adjacent the first side of the structural panel and a second secondary protruding end spatially disposed from said second secondary collar end and extending through the cavity to the second side of the structural panel; and
    (c) a secondary arcuate member secured to said first secondary protruding end of said first secondary leg member and to said second secondary protruding end of said second secondary leg member and configured extending through an arcuate shaped curve therebetween, said secondary arcuate member being formed of a flexibly resilient material to facilitate insertion of said secondary anchoring member through the cavity for engagement of the secondary arcuate member with the second side of the structural panel to facilitate retaining of said collar member adjacent the cavity on the first side of the structural member.

14. A firestop collar means with improved mounting means positioned adjacent an annular cavity defined between a structural panel having an aperture therein extending from the first side to the second side thereof and a generally cylindrical penetrating member extending through the aperture, said firestop collar means comprising:

A. a collar member positionable adjacent the first side of the structural panel surrounding the cylindrical penetrating member adjacent the cavity defined between the cylindrical penetrating member and the structural panel to facilitate sealing of the aperture to inhibit movement of fire, heat and smoke therethrough, said collar member defining a chamber means therewithin and wherein said chamber means contains an intumescent material which is expandable responsive to exposure to heat to fill the aperture defined in the structural member;

B. an anchoring means comprising:
  (1) first leg member attached to said collar member and extending through the cavity of the structural panel to the second side thereof, said first leg member defining a first collar end attached to the collar member adjacent the first side of the structural panel and a first protruding end spatially disposed from said first collar end and extending through the cavity to the second side of the structural panel;
  (2) a second leg member attached to said collar member at a position spatially disposed from said first leg member, said second leg member extending through the cavity of the structural panel to the second side thereof, said second leg member defining a second collar end attached to the collar member adjacent the first side of the structural panel and a second protruding end spatially disposed from said second collar end and extending through the cavity to the second side of the structural panel; and
  (3) a arcuate member of semi-circular shape secured to said first protruding end of said first leg member and to said second protruding end of said second leg member and extending through an arcuate shaped curve therebetween, said arcuate member being formed of a flexibly resilient material to facilitate insertion of said anchoring means through the cavity for engagement of the arcuate member with the second side of the structural panel to facilitate retaining of said collar member adjacent the cavity on the first side of the structural member, said arcuate member having a steady state radius of curvature being less than the radius of curvature of the generally cylindrical penetrating member to facilitate maintaining of engagement of said arcuate member with respect to the outer surface thereof during installation and to facilitate engagement of said arcuate member with respect to the second surface of the structural member when positioned installed through the cavity to the second side of the structural member, said arcuate member made of a flexibly resilient material which is sufficiently flexible in order to assume a radius of curvature approximately equal to the radius of curvature of the generally cylindrical penetrating member to facilitate insertion of said anchoring means through the cavity defined in the aperture between the structural member and the generally cylindrical penetrating member, said first leg member and said second leg member and said arcuate member of said anchoring means being formed of a single integral section of flexible wiring to facilitate insertion thereof into the annular cavity for engaging of said arcuate member against the second surface of the structural member.

15. A method for anchoring a firestop collar member to a first side of a structural member adjacent an aperture defined therein with a generally cylindrical penetrating member extending therethrough to define a cavity of generally annular shape therebetween extending through to the second surface of the structural member, comprising:

A. providing an anchoring device including an arcuate member with a given steady state radius of curvature which is flexibly resilient with two leg members secured thereto at positions spatially disposed from one another and extending outwardly away from the arcuate member:

B. applying of a force to the leg members in order to increase the relative distance therebetween for increasing the radius of curvature of the arcuate member by flexing thereof such that the increased radius of curvature is approximately equal to the radius of curvature of the annular cavity;

C. inserting of the arcuate member of the anchoring device into and completely through the annular cavity to a position adjacent the second surface of the structural member with the two leg members extending outwardly therefrom through the annular cavity and exiting therefrom adjacent the first surface of the structural member;

D. releasing of the force applied to the leg members to allow the legs and the arcuate member to assume the steady state radius of curvature thereof in order to allow the arcuate member to extend outwardly from the annular cavity;

E. moving the arcuate member into abutment with the second surface of the structural member immediately adjacent the annular cavity for securement thereagainst with both leg members positioned extending therefrom through the cavity and exiting thereof adjacent the first surface of the structural member;

F. providing a firestop collar for selectively sealing the aperture extending through the structural member; and G. securing of the firestop collar to the leg members of the anchoring device in a position surrounding the generally cylindrical penetrating member in abutment with the first side of the structural member around the aperture defined therethrough to facilitate sealing thereof responsive to conditions of fire, heat and smoke.

16. A method for anchoring a firestop collar member to a first side of a structural member adjacent an aperture defined therein with a generally cylindrical penetrating member extending therethrough to define a cavity of generally annular shape therebetween extending through to the second surface of the structural member as defined in claim 15 wherein said providing of an anchoring device includes two leg member extending outwardly away from the arcuate member approximately parallel with respect to one another to facilitate movement thereof and of the arcuate member through the generally annular cavity.

17. A method for anchoring a firestop collar member to a first side of a structural member adjacent an aperture defined therein with a generally cylindrical penetrating member extending therethrough to define a cavity of generally annular shape therebetween extending through to the second surface of the structural member as defined in claim 15 wherein said providing of the firestop collar includes providing of intumescent material to be retained therewithin and being adapted to intumescently expand to facilitate sealing of the aperture extending through the structural member responsive to heat.

18. A method for anchoring a firestop collar member to a first side of a structural member adjacent an aperture defined therein with a generally cylindrical penetrating member extending therethrough to define a cavity if generally annular shape therebetween extending through to the second surface of the structural member as defined in claim 15 wherein said providing of an anchoring device includes providing an arcuate member and a two leg members formed as a single integral member formed of a flexibly resilient wire member in order to facilitate flexing of the arcuate member as desired to selectively modify the radius of curvature thereof.

19. A method for anchoring a firestop collar member to a first side of a structural member adjacent an aperture defined therein with a generally cylindrical penetrating member extending therethrough to define a cavity of generally annular shape therebetween extending through to the second surface of the structural member as defined in claim 15 wherein said inserting of the arcuate member of the anchoring device is performed by placing the leg members of the anchoring device in abutment with the generally cylindrical penetrating member extending parallel with respect thereto and with the arcuate member in abutment with the outer circular circumference of the generally cylindrical penetrating member to more easily be movable through the annular cavity defined thereadjacent.

20. A meth d for anchoring a firestop collar member to a first side of a structural member adjacent an aperture defined therein with a generally cylindrical penetrating member extending therethrough to define a cavity of generally annular shape therebetween extending through to the second surface of the structural member as defined in claim 15 wherein said releasing of the force applied to the leg members allows the leg members to return to the steady state spacing therebetween in position extending through the annular cavity with the radius of curvature of the arcuate member in the steady state condition less than the radius of curvature of the annular cavity.

21. A method for anchoring a firestop collar member to a first side of a structural member adjacent an aperture defined therein with a generally cylindrical penetrating member extending therethrough to define a cavity of generally annular shape therebetween extending through to the second surface of the structural member as defined in claim 15 wherein said securing of the firestop collar to the leg members of the anchoring device is performed by placing the leg members of the anchoring device in direct abutment with the external surface of the generally cylindrical penetrating member and placing the firestop collar member in surrounding engagement extending over and around the penetrating member and the leg members of the anchoring members to hold the leg members in place.

22. A method for anchoring a firestop collar member to a first side of a structural member adjacent an aperture defined therein with a generally cylindrical penetrating member extending therethrough to define a cavity of generally annular shape therebetween extending through to the second surface of the structural member, comprising:

A. providing an first anchoring device including a first arcuate member with a given steady state radius of curvature which is flexibly resilient with two first leg members secured thereto spatially disposed from one another and extending outwardly away from the first arcuate member:

B. applying of a force to the first leg members in order to increase the relative distance therebetween for increasing the radius of curvature of the first arcuate member by flexing thereof such that the increased radius of curvature is approximately equal to the radius of curvature of the annular cavity;

C. inserting of the first arcuate member of the first anchoring device into and completely through the annular cavity to a position adjacent the second surface of the structural member with the two first leg members extending outwardly therefrom through the annular cavity and exiting therefrom adjacent the first surface of the structural member;

D. releasing of the force applied to the first leg members to allow the first leg members and the first arcuate member to assume the steady state radius of curvature thereof in order to allow the first arcuate member to move into direct abutment with respect to the second surface of the structural member;

E. allowing the first arcuate member to abut the second surface of the structural member immediately adjacent the annular cavity for securement thereagainst with both first leg members positioned extending therefrom through the cavity and exiting thereof adjacent the first surface of the structural member;

F. providing an second anchoring device including a second arcuate member with a given steady state radius of curvature which is flexibly resilient with two second leg members secured thereto spatially disposed from one another and extending outwardly away from the second arcuate member:

G. applying of a force to the second leg members in order to increase the relative distance therebetween for increasing the radius of curvature of the second arcuate member by flexing thereof such that the increased radius of curvature is approximately equal to the radius of curvature of the annular cavity;

H. inserting of the second arcuate member of the second anchoring device into and completely through the annular cavity at a location diametrically opposite from the position of inserting of the first arcuate member of the first anchoring device, the second arcuate member being inserted to a position adjacent the second surface of the structural member with the two second leg members extending outwardly therefrom through the annular cavity and exiting therefrom adjacent the second surface of the structural member;

I. releasing of the force applied to the second leg members to allow the second legs and the second arcuate member to assume the steady state radius of curvature thereof in order to allow the second arcuate member to move into direct abutment with respect to the second surface of the structural member;

J. allowing the second arcuate member to abut the second surface of the structural member immediately adjacent the annular cavity for securement thereagainst with both second leg members positioned extending therefrom through the cavity and exiting thereof adjacent the second surface of the structural member;

K. providing a firestop collar for selectively sealing the aperture extending through the structural member; and L. securing of the firestop collar to the leg members of the first anchoring device and the second anchoring device in a position surrounding the generally cylindrical penetrating member in abutment with the first side of the structural member around the aperture defined therethrough to facilitate sealing thereof responsive to conditions of fire, heat and smoke.

* * * * *